Sept. 29, 1970 D. W. TAYLOR 3,531,655

ELECTRICAL SIGNAL COMPARATOR

Filed Feb. 8, 1968

INVENTOR.
DOUGLAS W. TAYLOR

BY

Mueller Aichele & Rauner

ATTORNEYS 3,531,655

ELECTRICAL SIGNAL COMPARATOR

Douglas W. Taylor, Phoenix, Ariz., assignor to Motorola, Inc., Franklin Park, Ill., a corporation of Illinois Filed Feb. 2, 1968, Ser. No. 702,715
Int. Cl. H03k 5/20
U.S. Cl. 307—235 8 Claims

ABSTRACT OF THE DISCLOSURE

An integrated circuit having two transistors of identical geometries with the base of a first one connected to its collector and, in turn, connected to the base of the second transistor. A pair of identical resistors connect the collectors of both transistors to a power supply. The emitter electrodes of the two transistors form inputs such that the circuit compares the relative voltage magnitudes on the emitters very accurately near a zero difference potential. An output signal is supplied from the collector of the second transistor. The comparator is temperature stable over a very wide temperature range.

BACKGROUND OF THE INVENTION

This invention relates to electrical signal comparison circuits and more particularly to such a circuit usable for comparing signals having very small magnitude differentials.

Comparison circuits are widely used throughout the electronics industry for control purposes including voltage regulators, automotive electric systems, analog control systems, and the like. Semiconductor devices have been utilized to make null detectors in bridge circuits. Such detectors have been subject to drift in the operation caused by temperature variations. Also, certain inaccuracies were present in comparison of two signals having very similar magnitudes and very near a reference potential, for example, less than one volt from the reference potential. In making and using electrical comparison circuits, it is desirable that a single power supply be utilized to avoid errors in the comparisons caused by the relative drifts of two voltages supplied by two different power supplies or by relative drift of two voltages derived from a single supply.

SUMMARY OF THE INVENTION

It is an object of this invention to provide an improved signal comparison circuit which is relatively insensitive to temperature variations.

It is another object of this invention to provide a signal comparison circuit which is responsive to signals close to a reference potential and utilizes a single source of power.

The circuit embodied in the present invention includes a pair of transistors having identical geometries. A first one of the transistors has its collector and base regions shorted together and connected to the base region of a second transistor. The collectors of the two transistors are respectively connected through a pair of resistors through a common single power supply source. The resistance magnitude connected to the first transistor collector is equal to or greater than the resistance magnitude of the resistor connected to the second transistor. The output signal is taken from the collector region of the second transistor. The emitter regions are input means for receiving respectively independent signals to be compared.

THE DRAWINGS

DESCRIPTION OF THE ILLUSTRATIVE EMBODIMENT

Figure 1:
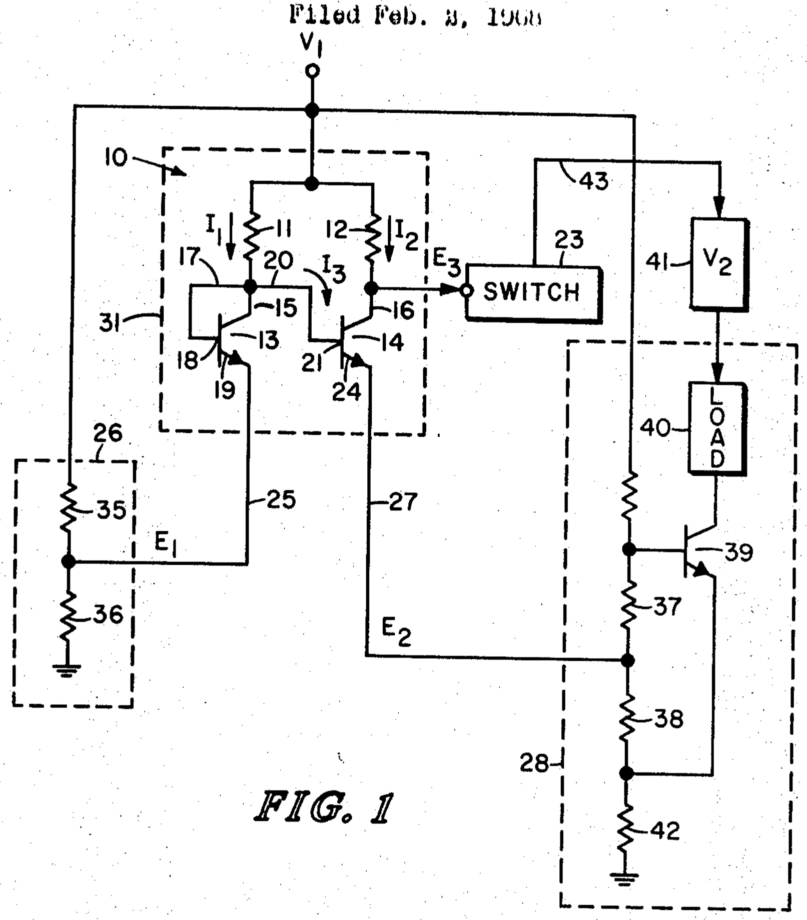
FIG. 1 is a schematic diagram of a circuit embodying the present invention.

With more particular reference to the drawing, like numbers denote like parts and structural features in the circuit diagram and in the diagrammatic perspective view. The signal comparison circuit 10 includes first and second resistors 11 and 12 having common ends connected to power supply $V_1$. Transistors 13 and 14 have their respective collectors 15 and 16 connected to resistors 11 and 12. Line 17 electrically shorts collector region 15 to base region 18 of transistor 13. Transistor 13 acts as a semiconductor diode between the collector region 15 and emitter region 19. Line 20 connects collector 15 to base 21 of transistor 14. Collector region 16 is connected to line 22 which carries the output signal to a utilization device such as electroresponsive switch 23. The transistor emitter regions 19 and 24 respectively receive signals to be compared. Line 25 connects emitter region 19 to input signal $E_1$ supplied by circuit 26, later described. A second input signal $E_2$ is supplied to emitter region 24 over line 27 from second signal source 28, also later described.

It is known that semiconductor rectifying junctions exhibit electrical characteristics which vary with temperature. When such rectifying junctions are made identical, such variations will also be substantially identical. One technique of making identical rectifying junctions is to utilize a single monolithic silicon body 30, indicated in FIG. 1 by dash box 31, in which the junction is formed by simultaneous and identical diffusions on epitaxial growth. As shown in FIG. 2, transistors 13 and 14 are formed in silicon die 30. With the geometries (including size, shape, doping levels, and gradations) of the collector regions, base regions, and emitter regions being identical in size and characteristics, the base-to-emitter junction is the one that controls the operation of a transistor and, of course, is the one that should be most closely controlled for insuring identical temperature variations in operation of the transistors 13 and 14.

When transistors 13 and 14 are formed with identical geometries on a single silicon chip 30, for example, and assuming that the base current, $I_3$, of transistor 14 is negligible, the resistance values of resistors 11 and 12 being equal or the resistance of 12 being less than that of resistor 11, and with the input signals $E_1$ and $E_2$ being equal, the electrical currents flowing through resistors 11 and 12, $I_1$ and $I_2$, are equal. This operating condition remains over a wide temperature range. When the electrical resistance values of resistors 11 and 12 are equal, and the input signals have equal magnitudes, then the output voltage $E_3$ will equal the base voltage of transistor 14, i.e., the voltage to ground on line 20. When this situation exists, transistor 14 is operated far out of current saturation. Any change in the input signal magnitudes of $E_1$ or $E_2$ will be amplified by "$g_m$R2" wherein $g_m$ is the gain characteristic of transistor 14 and R2 is the resistance value of resistor 12. In operating these just-described circuits, stability of operation with respect to variations of the input signals $E_1$ and $E_2$ of a few microvolts per degree centigrade were achieved. Such operation was accomplished with both $E_1$ and $E_2$ close to ground reference potential (less than one volt) and of opposite polarities.

As signal $E_2$ approaches $V_1$, with $E_1$ remaining constant, the output signal $E_3$ approaches $V_1$. When $E_2$ changes in magnitude further from supply voltage $V_1$ magnitude, then $E_3$ correspondingly changes magnitude further from $V_1$. A null condition between $E_1$ and $E_2$ is indicated by a predetermined voltage magnitude of $E_3$, which magnitude is detectable by electroresponsive switch 23 to control circuitry later described. The null condition is also indicated by equal amplitude of currents $I_1$ and $I_2$. A transformer (not shown) may be used to detect the relative current magnitudes for indicating a null.

Figure 2:
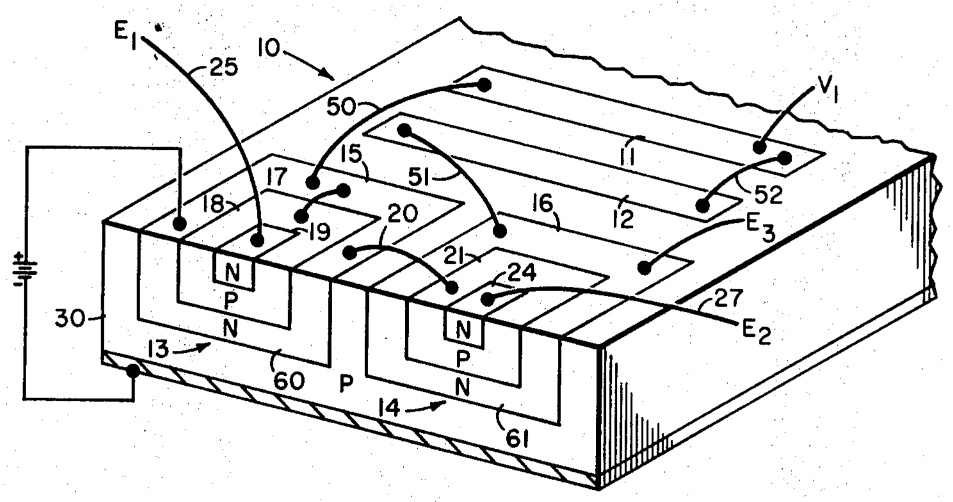
FIG. 2 is a diagrammatic perspective showing of an integrated circuit chip embodying the present invention with the transistor elements shown in partial sectional form.

Referring now more particularly to FIG. 1, voltage source $V_1$ supplies voltage and current to first input circuit 26 which consists of a voltage divider having resistors 35 and 36 for supplying a relatively constant reference potential as the first input signal $E_1$. A second circuit 28 has the voltage divider, including resistors 37 and 38, between which the second input signal $E_2$ is obtained. The second input signal $E_2$ is determined in part by the current flowing through resistor 42 from transistor 39 as supplied through a load 40 from a second power supply source 41. The voltage drop across resistor 42 indicates whether or not the current amplitude flowing through transistor 39 is greater than that permitted for load 40. As the voltage drop across resistor 42 increases beyond a predetermined magnitude, excess of current flow is indicated. As $E_2$ approaches $V_1$ because of the increased voltage drop across resistor 42, the output voltage $E_3$ approaches $V_1$ and at some predetermined magnitude electroresponsive switch 23 will turn off second voltage supply 41 to the control line connection 43. Electroresponsive switch 23, power supply 41, and load 40 may be any devices known to the trade.

The single supply source $V_1$ provides the voltage for both input signals $E_1$ and $E_2$. Therefore, any variation in the supply voltage has no effect on the comparison since it is applied to both input lines 25 and 27 of circuit 10. In this manner, the FIG. 1 illustrated circuit operates as a current limiting device for load 40.

Referring next to FIG. 2, an integrated circuit version of FIG. 1 circuit inside dash box 31 is shown. Resistors 11 and 12 may be of the diffused type known in the art. Lines 50, 51, 52 make connections on top of the integrated circuit chip 30. Such connections, including other connections previously referred to such as line 17, etc., may be formed through deposited metallization layers insulated from the silicon chip as by a deposited oxide. Further, the junction terminations on the one major face 52 of silicon chip 30 may be passivated using known techniques.

The proximity of the transistor junctions in a single silicon chip insures both junctions remain at substantially the same temperature. The good thermally-conductive path provided by the silicon material is not interrupted when the electrical isolation between the transistor-type devices 13, 14 and silicon chip 30 is provided by reverse biased junctions 60 and 61. If glass insulation is substituted for the reverse biased isolation junctions, the thickness should be selected so as not to provide a high thermal barrier.

I claim:

1. A temperature-compensated comparison circuit for comparing two signals of similar amplitudes, the improvement including in combination, a body of semiconductive material having first and second transistor-type structures of identical geometries, and electrically isolated from the remainder of said body, each transistor having collector, base, and emitter regions, an ohmic connection between said first transistor base region, said first transistor collector region and said second transistor base region, first and second resistance means having a common connection and connected to said first and second transistor-type structure collector regions, respectively, a power supply connection to said common connection, input means connected, respectively, to said emitter regions, and said collector region of said second transistor-type structure having an output signal connection for supplying a signal indicative of the voltage amplitude difference between said input means connections.

2. The circuit of claim 1 wherein said body has a major face and said transistor-type structures extend into said body from said major face with all junctions terminating at said major face.

3. The circuit of claim 1 wherein said first resistance means has an electrical impedance not less than the electrical impedance of said second resistance means.

4. The circuit of claim 3 further including first and second signal input circuits each having a voltage dividing network connected to said common connection for supplying input signals to said emitter regions having a constant relation to voltage on said common connection, one of said input circuits having circuit means connected to its voltage dividing network for altering said relationship.

5. The circuit of claim 1 wherein said first and second resistance means have identical electrical impedances.

6. The circuit of claim 1 wherein said transistor-type structures are proximate one with the other in said body and in good thermal connection such that temperatures within both said transistor-type structures are substantially the same.

7. A temperature insensitive comparison circuit for comparing two signals of similar amplitudes, the improvement including the combination, first and second transistors of identical construction and each having base, collector, and emitter electrodes, the base electrode of said first transistor being directly connected to the base electrode of said second transistor and to the collector electrode of said first transistor, first and second resistors respectively connected to the collector electrodes of said first and second transistors and connected to a common power supply terminal, said emitter electrodes of said first and second transistors adapted to receive signals to be compared, means keeping the temperatures of both said first and second transistors substantially the same, and output means connected to said collector electrode of said second transistor for supplying a signal indicative of the comparison between the signals on the emitter electrodes of said first and second transistors.

8. The comparison circuit of claim 7 further including input means connected to each of said emitter electrodes and said input means being connected to said power supply terminal for receiving all of their power therefrom.

References Cited

UNITED STATES PATENTS 3,364,434 1/1968 Widlar ---------- 330—30 XR

STANLEY T. KRAWCZEWICZ, Primary Examiner

U.S. Cl. X.R.

307—303, 310; 328—147; 330—2, 30